United States Patent
Tanaka et al.

(10) Patent No.: US 9,235,770 B2
(45) Date of Patent: Jan. 12, 2016

(54) IMAGE PROCESSING DEVICE, IMAGE PROCESSING METHOD, AND COMPUTER READABLE MEDIUM

(71) Applicant: OMRON Corporation, Kyoto-Shi (JP)

(72) Inventors: Bunzo Tanaka, Kusatsushi (JP); Masamichi Kogure, Otsu (JP); Koji Togo, Kusatsushi (JP); Koichiro Kajitani, Otsu (JP)

(73) Assignee: OMRON CORPORATION, Kyoto-shi (JP)

( * ) Notice: Subject to any disclaimer, the term of this patent is extended or adjusted under 35 U.S.C. 154(b) by 90 days.

(21) Appl. No.: 14/136,956

(22) Filed: Dec. 20, 2013

(65) Prior Publication Data

US 2014/0198950 A1 Jul. 17, 2014

(30) Foreign Application Priority Data

Jan. 11, 2013 (JP) .................................. 2013-003209

(51) Int. Cl.
*G06K 9/00* (2006.01)
(52) U.S. Cl.
CPC ........ *G06K 9/00993* (2013.01); *G06K 9/00771* (2013.01)
(58) Field of Classification Search
CPC combination set(s) only.
See application file for complete search history.

(56) References Cited

U.S. PATENT DOCUMENTS

| 7,450,768 B2* | 11/2008 | Sakuyama et al. ............ 382/232 |
| 7,893,997 B2* | 2/2011 | Chou ............................ 348/536 |
| 8,000,542 B2* | 8/2011 | Sakuyama et al. ............ 382/232 |
| 8,130,907 B2* | 3/2012 | Maurer et al. .................. 378/65 |
| 8,150,194 B2* | 4/2012 | Fujibayashi et al. .......... 382/260 |
| 8,467,576 B2* | 6/2013 | Woo et al. ..................... 382/103 |
| 8,971,490 B2* | 3/2015 | Maurer et al. .................. 378/65 |
| 2006/0103685 A1* | 5/2006 | Chou ............................ 345/698 |
| 2011/0081048 A1* | 4/2011 | Woo et al. ..................... 382/103 |
| 2012/0014579 A1* | 1/2012 | Li et al. ........................ 382/131 |

FOREIGN PATENT DOCUMENTS

JP 09-265585 A 10/1997

* cited by examiner

*Primary Examiner* — Anand Bhatnagar
(74) *Attorney, Agent, or Firm* — Nutter McClennen & Fish LLP; John J. Penny, Jr.

(57) ABSTRACT

An image processing device is provided, the image processing device comprising: an image input unit configured to be input with a frame image of an imaging area imaged by a camera; an image processing unit configured to process the frame image input to the image input unit, and detect an object imaged in the frame image; and an operation frequency determination unit configured to determine a frequency of an operation clock of the image processing unit according to the number of objects detected by the image processing unit, wherein the operation frequency determination unit lowers the frequency of the operation clock of the image processing unit as the number of objects detected by the image processing unit becomes smaller.

14 Claims, 3 Drawing Sheets

IMAGE PROCESSING DEVICE, IMAGE PROCESSING METHOD, AND COMPUTER READABLE MEDIUM

CROSS-REFERENCE TO RELATED APPLICATION(S)

This application claims the benefit of priority from Japanese Patent Application No. 2013-003209, filed on 11 Jan. 2013, the entire contents of which is incorporated herein by reference for all purpose.

BACKGROUND OF THE INVENTION

The present invention relates to a technique of processing a frame image of an imaging area imaged by a camera, and detecting an imaged object.

Conventionally, there has been proposed an image processing device configured to process a frame image of an imaging area imaged by a camera, and perform detection of an imaged object such as a person, vehicle, or the like and tracking of the detected object (see JP 9-265585 A). The general image processing device of the related art generates a differential image (background differential image) of the frame image of the imaging area imaged by the camera and a background image of the imaging area, a differential image (inter-frame differential image) of the two temporally successive frame images, and the like as shown in JP 9-265585 A, and the like to detect and track the object.

However, in the conventional image processing device, a frequency (clock frequency) of an operation clock of a processor (image processing processor) is fixed. The image processing processor processes the frame image of the imaging area imaged by the camera.

In the image processing processor, the processing speed becomes faster as the frequency of the operation clock becomes higher, and the power consumption increases. The load applied on the image processing processor becomes greater as the number of objects imaged in the frame image becomes larger.

Therefore, the conventional image processing device has defined the frequency of the operation clock of the image processing processor so as to obtain the processing speed required when the number of objects imaged in the frame image is large. Thus, if the number of objects imaged in the frame image is relatively small, the processing speed of the image processing processor becomes faster than necessary, and the power consumption becomes unnecessarily large. Furthermore, since the heat generation amount becomes larger as the power consumption is larger, the lifespan of the image processing processor becomes short.

It is desired to provide a technique capable of efficiently reducing power consumption and extending a lifespan.

SUMMARY

In accordance with one aspect of at least one embodiment of the present invention, an image processing device comprises: an image input unit configured to be input with a frame image of an imaging area imaged by a camera; an image processing unit configured to process the frame image input to the image input unit, and detect an object imaged in the frame image; and an operation frequency determination unit configured to determine a frequency of an operation clock of the image processing unit according to the number of objects detected by the image processing unit, wherein the operation frequency determination unit lowers the frequency of the operation clock of the image processing unit as the number of objects detected by the image processing unit becomes smaller.

In accordance with another aspect of at least one embodiment of the present invention, an image processing method executed by a computer comprises the steps of: processing a frame image of an imaging area imaged by a camera and input to an image input unit, and detecting an object imaged in the frame image; and determining a frequency of an operation clock that determines an execution speed of the image processing step according to the number of objects detected in the image processing step.

DETAILED DESCRIPTION

An image processing device according to an embodiment of the present invention will be hereinafter described.

Figure 1:
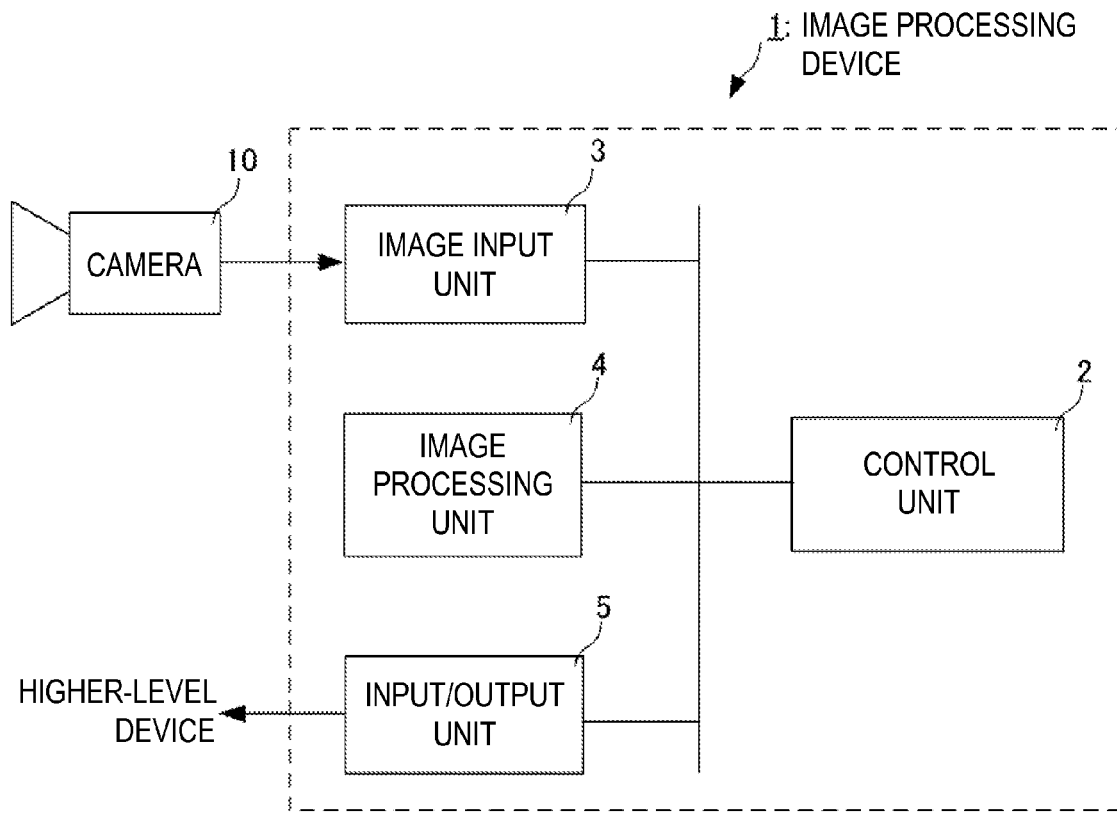
FIG. 1 is a view showing a configuration of main parts of an image processing device.

FIG. 1 is a view showing a configuration of the main parts of the image processing device according to the embodiment of the present invention.

An image processing device 1 includes a control unit 2, an image input unit 3, an image processing unit 4, and an input/output unit 5.

The control unit 2 controls the operation of each unit in the main body of the image processing device 1.

The image input unit 3 is input with a frame image of an imaging area imaged by a camera 10. The camera 10 may be integrally arranged on the main body of the image processing device 1, or may be arranged as a separate casing from the main body of the image processing device 1. In the case where the camera 10 is a separate casing from the main body of the image processing device 1, the camera 10 is connected to the main body of the image processing device 1 with a cable. The camera 10, for example, inputs to the image input unit 3 the frame image of about 10 to 30 frames in one second.

The image processing unit 4 processes the frame image input to the image input unit 3, and detects an object imaged in the frame image. The object detected by the image processing unit 4 is defined in advance according to applications, and is a person or a vehicle, for example. In the case where the person is detected as the object, the image processing unit 4 cuts out the face of the detected person, and performs an attribute estimation process of estimating attributes such as sex, age, and the like of the person, a face recognition process of authenticating whether or not the detected person is a registrant registered in advance, and the like. In the case where the vehicle is detected as the object, the image processing unit 4 cuts out a number plate attached to the vehicle, and performs a character recognition process of recognizing the number plate number displayed on the number plate, and the like.

The input/output unit 5 outputs the processing results of the image processing unit 4 to a higher-level device and the like (not shown). The input/output unit 5 also receives an input from the higher-level device and the like.

Figure 2:
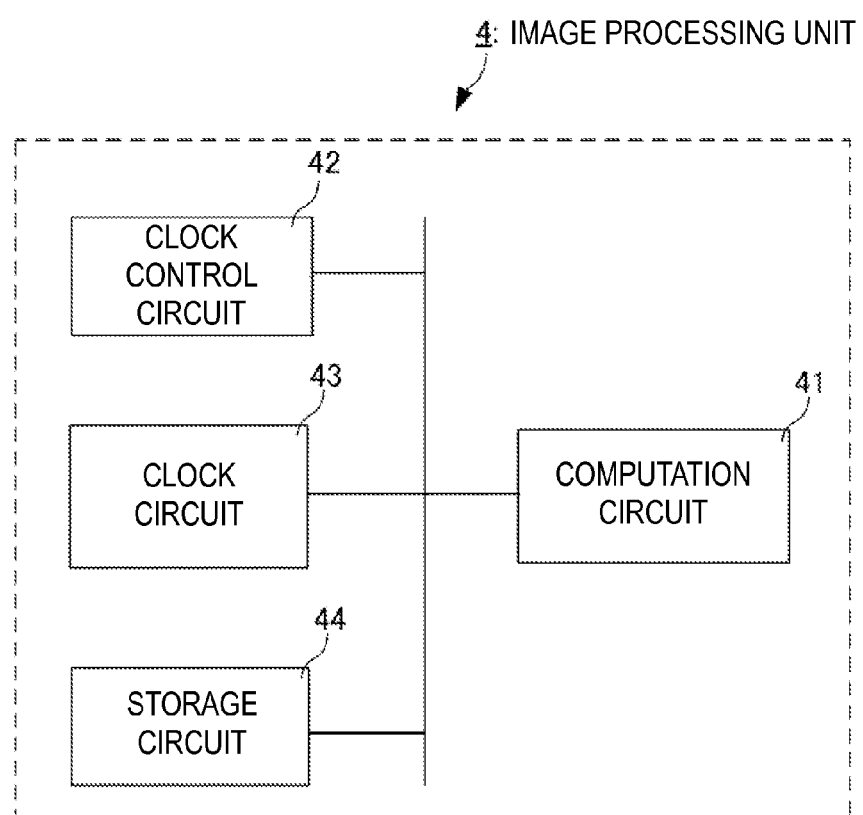
FIG. 2 is a view showing a configuration of an image processing unit.

The image processing unit 4 will be more specifically described. FIG. 2 is a schematic view showing a configuration of the image processing unit. The image processing unit 4 includes a computation circuit 41, a clock control circuit 42, a clock circuit 43, and a storage circuit 44.

The computation circuit 41 performs computation processing and the like associated with the above-described image processing on the frame image imaged by the camera 10.

The clock control circuit 42 controls the clock circuit 43, and controls the frequency of the operation clock provided by the clock circuit 43 to the computation circuit 41 and the like. In this example, the clock control circuit 42 selects and determines the frequency of the operation clock provided by the clock circuit 43 to the computation circuit 41 and the like, from f1, f2, f3 (f1>f2>f3>0) defined in advance. The clock control circuit 42 has a configuration corresponding to a frequency determination unit in the present invention.

The storage circuit 44 is used as a working region of the computation processing associated with the image processing of the computation circuit 41. The storage circuit 44 also stores the frequencies f1, f2, f3 of the operation clock to provide to the computation circuit 41 and the like, a specific region set with respect to the frame image imaged by the camera 10 to be described later, and the like.

The image processing unit 4 is configured by a processor of one chip. The image processing unit 4 corresponds to an image processing program, and a computer for executing the image processing method according to the present invention.

The operation of the image processing device 1 according to the embodiment of the present invention will be hereinafter described.

Figure 3A:
FIGS. 3A and 3B are views showing a frame image imaged by a camera.
Figure 3B:

First, the process of setting a specific region with respect to the frame image imaged by the camera 10 will be described. FIG. 3A is a view showing the frame image imaged by the camera. FIG. 3B shows an example in which the frame image imaged by the camera is substantially evenly divided into 3×3=9 regions. In FIGS. 3A and 3B, the dividing line of the region is shown with a broken line.

The division of the region with respect to the frame image is not limited to dividing into nine regions as shown in FIG. 3B, and may be divided into 12 regions or 16 regions. Moreover, each region obtained by dividing the frame image may not have an equal size.

The operator specifies a specific region from the regions (hereinafter referred to as divided region) divided with respect to the frame image. Specifically, the divided region to be the specific region is specified by operating the higher-level device, to which the image processing device 1 is connected, or an operation unit (not shown) of the image processing device 1. One or a plurality of divided regions may be specified as the specific region. However, the total number of divided regions to be specified as the specific region is less than the dividing number of regions with respect to the frame image. In other words, at least one divided region that is not specified as the specific region exists.

The operator specifies, as the specific region, the divided region corresponding to a location where the possibility that the object (a person herein) entering the imaging area of the camera 10 will pass is high. For example, in the example shown in FIG. 3B, the divided region positioned at the right end of the lower stage and the divided region positioned at the middle of the lower stage may be specified as the specific region.

When a specification of the specific region with respect to the frame image is received in the image processing device 1, the image processing unit 4 stores the specified specific region in the storage circuit 44.

In the example described above, the specific region is selected from the divided regions obtained by dividing the frame image, but the operator may arbitrarily specify the position and size of the specific region with respect to the frame image using a pointing device and the like.

Figure 4:
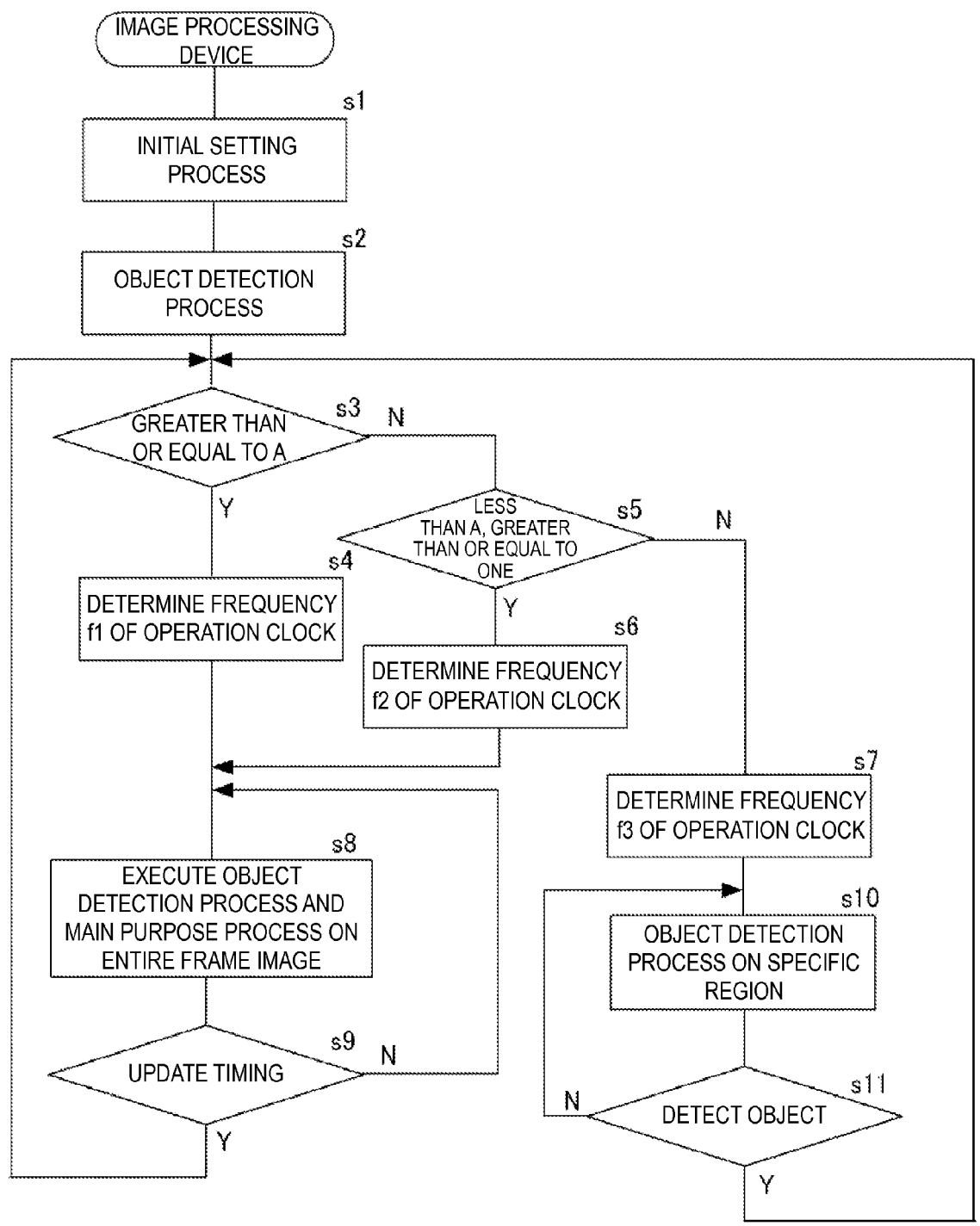
FIG. 4 is a flowchart showing image processing in the image processing device.

The image processing of processing the frame image of the imaging area imaged by the camera 10 and detecting the object will now be described. FIG. 4 is a flowchart showing the image processing in the image processing device.

The image processing device 1 performs an initial setting process (s1). In s1, the image processing unit 4 sets a specific region with respect to the frame image imaged by the camera 10. As described above, the image processing unit 4 stores the specific region specified by the operator with respect to the frame image in the storage circuit 44. In the image processing unit 4, the clock control circuit 42 determines the frequency of the operation clock to provide to the computation circuit 41 and the like as f1 (maximum frequency). The clock circuit 43 provides the operation clock having the frequency f1 determined by the clock control circuit 42 to the computation circuit 41 and the like.

The image processing device 1 processes the frame image of the imaging area imaged by the camera 10 and input to the image input unit 3, and detects the imaged object (the person in this example) (s2). In s2, a differential image (background differential image) of a background image of the imaging area of the camera 10 and the frame image input to the image input unit 3 is generated, and the object imaged in the frame image input this time is detected. The background image may be stored in the storage circuit 44 of the image processing unit 4, or may be stored in a storage device and the like (not shown) arranged in the image processing device 1. In s2, the most recent frame image input to the image input unit 3 is processed.

The process of generating the background differential image and detecting the object imaged in the input frame image is known, and thus the detailed description thereof will be omitted. The image processing unit 4 updates the background image of the imaging area of the camera 10 at an appropriate timing.

The imaged object is merely extracted in s2, and the attribute estimation process, the face recognition process, the character recognition process, and the like (hereinafter collectively referred to as main purpose process) are not carried out.

The image processing unit 4 selects and determines the frequency of the operation clock to provide to the computation circuit 41 and the like from f1, f2, f3 (f1>f2>f3>0) defined in advance by the clock control circuit 42 (s3 to s7).

Specifically, if the number of objects detected in an object detection process associated with s2 is greater than or equal to A (e.g., five) defined in advance, the clock control circuit 42 determines the frequency of the operation clock as f1 (s4). If the number of objects detected in the object detection process associated with s2 is less than A and greater than or equal to one, the clock control circuit 42 determines the frequency of the operation clock as f2 (s6). If the object is not detected in the object detection process associated with s2, the clock control circuit 42 determines the frequency of the operation clock as f3 (s7).

The clock circuit 43 provides the operation clock having the frequency determined by the clock control circuit 42 to the computation circuit 41 and the like in the processes associated with s3 to s7.

When the frequency of the operation clock is determined as f1 in s4 or the frequency of the operation clock is determined as f2 in s6, the image processing unit 4 sequentially processes the frame image of the imaging area imaged by the camera 10 and input to the image input unit 3, and executes the object detection process and the main purpose process until reaching the update timing of the frequency of the operation clock (s8, s9).

The update timing of the frequency of the operation clock may be the timing at which a prescribed time (e.g., few seconds to several tens of seconds) defined in advance has elapsed from the timing at which the frequency of the operation clock is determined most recently, or may be the timing at which the number of frames of the frame image processed in s8 reached a predefined number of frames from the timing at which the frequency of the operation clock is determined most recently.

The determination on whether or not the update timing is reached related to s9 is carried out by the control unit 2. When determined that the update timing is reached, the control unit 2 instructs the update of the frequency of the operation clock to the image processing unit 4 (clock control circuit 42). The process related to s9 of the control unit 2 is the configuration corresponding to the timing control unit in the present invention.

When determined that the update timing is reached in s9, the image processing unit 4 returns to s3 and repeats the process described above. In this case, the frequency of the operation clock is determined according to the number of objects detected from the frame image processed most recently in s8.

When the frequency of the operation clock is determined as f3 in s7, the image processing unit 4 processes only the specific region set for the frame image of the imaging area imaged by the camera 10 and input to the image input unit 3 (s10). In s10, only the detection process of the object is carried out, and the main purpose process is not carried out. The image processing unit 4 repeats the process related to s10 on the frame image input to the image input unit 3, and returns to s3 when the object is detected (s11).

Thus, the image processing device 1 changes, in a stepwise manner, the frequency of the operation clock according to the number of detected objects. Specifically, the image processing device 1 lowers the frequency of the operation clock as the number of detected objects becomes smaller. In other words, the image processing device 1 increases the frequency of the operation clock as the number of detected objects becomes greater. Therefore, the image processing device 1 can set the clock frequency to be the frequency at which the processing speed required on the image processing unit 4 at the relevant time point can be obtained. The processing speed of the image processing unit 4 thus can be suppressed from becoming faster than necessary with respect to the required processing speed, and hence the power consumption can be efficiently reduced. Furthermore, the lifespan of the image processing unit 4 can be extended since the heat generation amount of the image processing unit 4 can be efficiently suppressed.

If the imaged object is not detected in the process with respect to the entire frame image input to the image input unit 3, the detection process of the imaged object is carried out limiting to the set specific region, and hence the power consumption of the image processing unit 4 can be more efficiently reduced.

As described above, the region on the frame image corresponding to the location where the object passes when entering from the outside of the imaging area to the inside of the imaging area is set as the specific region, and thus a problem in that the main purpose process is not executed on the object imaged in the frame image imaged by the camera 10 does not arise.

In the example described above, a configuration of changing the frequency of the operation clock in three stages according to the number of detected objects has been described, but the number of stages to change the frequency of the operation clock may be determined according to the performance of the processor configuring the image processing unit 4. A function $G(\alpha)$ having the number a of detected objects as a parameter may be defined, and the frequency f of the operation clock may be calculated with the function $G(\alpha)$. In other words, $f=G(\alpha)$, where f is the frequency of the operation clock.

In this case, however, the frequency f of the operation clock is defined so as not to exceed the upper limit value defined in the specification of the processor configuring the image processing unit 4.

With the process related to s9 shown in FIG. 4, the frequency of the operation clock can be prevented from being frequently changed. Thus, in the image processing unit 4, the load of the process related to changing the frequency of the operation clock is suppressed, and the lifespan of the image processing unit 4 can be further extended.

Disclosed is an image processing device including an image input unit is input with a frame image of an imaging area imaged by a camera. The camera may be integrally arranged on a main body of the image processing device 1, or may be connected with a cable.

An image processing unit processes the frame image input to the image input unit, and detects an object imaged in the frame image. The image processing unit generates, for example, a background differential image and an inter-frame differential image, and detects an object imaged in the frame image. The object referred to herein is a person, a vehicle, or the like.

A frequency determination unit determines the frequency of the operation clock of the image processing unit according to the number of objects detected by the image processing unit. Specifically, the operation frequency determination unit lowers the frequency of the operation clock of the image processing unit as the number of objects detected by the image processing unit becomes smaller. In other words, the operation frequency determination unit increases the frequency of the operation clock of the image processing unit as the number of objects detected by the image processing unit becomes larger. Thus, in the image processing unit, the required processing speed becomes faster as the number of detected objects becomes larger. Furthermore, the processing speed of the image processing unit becomes faster as the frequency of the operation clock becomes higher.

Therefore, the frequency determination unit can determine the frequency of the operation clock to be a value at which the processing speed required on the image processing unit at the relevant time point can be obtained. The processing speed of the of the image processing unit thus can be controlled according to the change in the number of detected objects. In other words, the processing speed of the image processing unit is suppressed from becoming faster than necessary with respect to the required processing speed, and hence the power consumption can be efficiently reduced. Furthermore, the heat generation amount of the image processing unit can also be efficiently suppressed, and hence the lifespan of the image processing unit can be extended.

The image processing device may additionally include a specific region setting unit configured to set a specific region with respect to the frame image of the imaging area imaged by the camera. In this case, the image processing unit may be configured to detect the imaged object within the specific region set by the specific region setting unit, under a condition that the imaged object is not detected in the process performed on the entire frame image input to the image input unit.

The specific region may be a region on the frame image corresponding to a location where the object passes when entering from the outside of the imaging area to the inside of the imaging area. Thus, the processing load of the image processing unit can be further suppressed, whereby the frequency of the operation clock of the image processing unit can be further lowered.

The specific region may be configured such that the operator can specify an arbitrary location with respect to the frame image, or may be configured such that the operator specifies one or more regions from a plurality of regions obtained by dividing the frame image.

The image processing device may be additionally provided with a timing control unit configured to control a timing at which the operation frequency determination unit determines the frequency of the operation clock of the image processing unit. The timing control unit controls the timing to determine the frequency of the operation clock of the image processing unit so as not to frequently switch the frequency of the operation clock of the image processing unit.

Therefore, the power consumption can be efficiently reduced and the lifespan can be extended.

The invention claimed is:

1. An image processing device comprising:
   an image input unit configured to be input with a frame image of an imaging area imaged by a camera;
   an image processing unit configured to process the frame image input to the image input unit, and detect an object imaged in the frame image; and
   an operation frequency determination unit configured to determine a frequency of an operation clock of the image processing unit according to the number of objects detected by the image processing unit, wherein
   the operation frequency determination unit lowers the frequency of the operation clock of the image processing unit as the number of objects detected by the image processing unit becomes smaller.

2. The image processing device according to claim 1, further comprising a specific region setting unit configured to set a specific region with respect to the frame image of the imaging area imaged by the camera, wherein
   the image processing unit detects the imaged object within the specific region set by the specific region setting unit, under a condition that the imaged object is not detected in the process performed on the entire frame image input to the image input unit.

3. The image processing device according to claim 2, wherein the specific region setting unit sets a region in a plurality of regions as the specific region, the plurality of regions being obtained by dividing the frame image input to the image input unit.

4. The image processing device according to claim 3, wherein the operation frequency determination unit lowers, in a step-wise manner, the frequency of the operation clock of the image processing unit as the number of objects detected by the image processing unit becomes smaller.

5. The image processing device according to claim 4, further comprising a timing control unit configured to control a timing at which the operation frequency determination unit determines the frequency of the operation clock of the image processing unit.

6. The image processing device according to claim 3, further comprising a timing control unit configured to control a timing at which the operation frequency determination unit determines the frequency of the operation clock of the image processing unit.

7. The image processing device according to claim 2, wherein the operation frequency determination unit lowers, in a step-wise manner, the frequency of the operation clock of the image processing unit as the number of objects detected by the image processing unit becomes smaller.

8. The image processing device according to claim 7, further comprising a timing control unit configured to control a timing at which the operation frequency determination unit determines the frequency of the operation clock of the image processing unit.

9. The image processing device according to claim 2, further comprising a timing control unit configured to control a timing at which the operation frequency determination unit determines the frequency of the operation clock of the image processing unit.

10. The image processing device according to claim 1, wherein the operation frequency determination unit lowers, in a step-wise manner, the frequency of the operation clock of the image processing unit as the number of objects detected by the image processing unit becomes smaller.

11. The image processing device according to claim 10, further comprising a timing control unit configured to control a timing at which the operation frequency determination unit determines the frequency of the operation clock of the image processing unit.

12. The image processing device according to claim 1, further comprising a timing control unit configured to control a timing at which the operation frequency determination unit determines the frequency of the operation clock of the image processing unit.

13. An image processing method executed by a computer, the method comprising the steps of:
    processing a frame image of an imaging area imaged by a camera and input to an image input unit, and detecting an object imaged in the frame image; and
    lowering a frequency of an operation clock that determines an execution speed of the image processing step as the number of objects detected in the image processing step becomes smaller.

14. A non-transitory computer readable medium storing an image processing program configured to cause a computer to execute the steps of:
    processing a frame image of an imaging area imaged by a camera and input to an image input unit, and detecting an object imaged in the frame image; and
    lowering a frequency of an operation clock that determines an execution speed of the image processing step as the number of objects detected in the image processing step becomes smaller.

* * * * *